(No Model.)

R. C. FAY.
WHEEL FOR CYCLES.

No. 484,952. Patented Oct. 25, 1892.

UNITED STATES PATENT OFFICE.

RIMMON C. FAY, OF ILION, NEW YORK, ASSIGNOR TO THE REMINGTON ARMS COMPANY, OF SAME PLACE.

WHEEL FOR CYCLES.

SPECIFICATION forming part of Letters Patent No. 484,952, dated October 25, 1892.

Application filed March 28, 1892. Serial No. 426,775. (No model.)

*To all whom it may concern:*

Be it known that I, RIMMON C. FAY, of Ilion, in the county of Herkimer and State of New York, have invented a new Improvement in Wheels for Cycles; and I do hereby declare the following, when taken in connection with accompanying drawings and the letters of reference marked thereon, to be a full, clear, and exact description of the same, and which said drawings constitute part of this specification, and represent, in—

Figure 1:
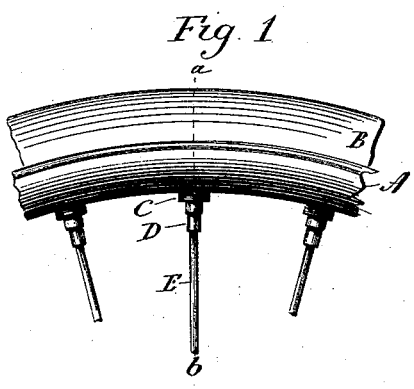
Figure 2:
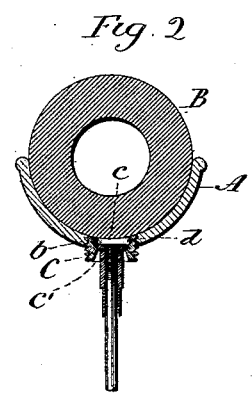

Figure 1, a view in side elevation of a section of a wheel-rim having its spokes attached to it in accordance with my invention; Fig. 2, a view thereof in transverse section on the line *a b* of Fig. 1.

This invention relates to an improvement in wheels for cycles, the object being to provide simple and effective couplings between the outer ends of the spokes and the wheel-felly, whereby any spoke may be removed and replaced without disturbing the others, and whereby the spokes are left free to accommodate themselves to the lines in which they are strained.

With these ends in view my invention consists in the combination, with a wheel-felly having a threaded opening in its inner periphery, of a removable threaded bushing inserted into the said opening and having its inner face concaved to form a socket and its outer face cut away for clearance, a spoke having its outer end threaded, and a threaded nipple applied to the said spoke and having its outer end shaped to fit the socket of the bushing, as will be more fully hereinafter described, and pointed out in the claim.

As herein shown, the wheel rim or felly A is made nearly hemispherical in transverse section and of a single thickness of metal; but this rim, as I would have it understood, may be replaced by any other form of rim. As herein shown, also, the tire B has a central opening to secure a cushioning effect; but this tire may also be replaced by a tire of any other approved construction, the particular construction of the rim and tire not being essential to my invention. The rim is constructed with a series of threaded openings *b*, formed in its inner periphery and in line with each other. Each of these openings receives an externally-threaded bushing C, the inner face whereof is concaved to form a socket *c*, while its outer face is cut away to form a clearance-space *c'*. The said socket *c* of the bushing receives an enlarged beveled head *d*, formed upon the outer end of the internally-threaded nipple D, the said head and socket forming the respective members of a ball-and-socket joint, permitting the nipple, and hence the spoke E, the threaded outer end of which is entered into it, to accommodate themselves to the line on which the spoke is strained. Under the described construction, therefore, I am enabled to apply the spokes on the well-known suspension principle, in which they are staggered, without bending their outer ends, as has heretofore been done, and securing the best results with the minimum of strain, owing to the fact that such strain as is placed upon the spokes is exerted directly, inasmuch as the accommodation of the nipples and spokes to the lines on which the spokes are strained permits the tension to act directly.

It will be apparent that when it is desired to remove and replace any spoke it may be done by first removing the bushing, after which the spoke may be slipped out of the same. On the other hand, the spokes are replaced in the same manner by first combining the nipple, bushing, and spoke and then screwing the bushing into its place, after which the desired tension may be secured by turning the bushing or nipple, or both.

I am aware that it is old to construct a wheel-felly with a threaded opening in its inner periphery and to insert into the said opening a threaded bushing having its inner end countersunk to receive the beveled head of a nipple which receives the outer end of the spoke. I am also aware that it is old to flexibly connect the outer end of a spoke with its wheel-felly. I do not therefore claim either of those constructions, broadly, but only my particular construction.

Having fully described my invention, what I claim as new, and desire to secure by Letters Patent, is—

The combination, with a wheel-rim having a threaded opening in its inner periphery, of a removable threaded bushing inserted into the said opening and having its inner face concaved to form a socket and its outer face cut away for clearance, a spoke having its outer end threaded, and a threaded nipple applied to the said spoke and having its outer end shaped to fit the socket of the bushing, substantially as set forth, and whereby the nipple is free to accommodate itself in the bushing to the line in which the spoke is strained within the limits of movement afforded by the clearance-space formed by cutting away the outer face of the bushing.

In testimony whereof I have signed this specification in the presence of two subscribing witnesses.

RIMMON C. FAY.

Witnesses:
    FREDERICK ARMSTRONG,
    GEORGE HUMPHREYS.